United States Patent
George-Kelso et al.

(10) Patent No.: US 9,166,475 B2
(45) Date of Patent: Oct. 20, 2015

(54) VOLTAGE REGULATOR WITH FAST AND SLOW SWITCHING CONTROL

(71) Applicants: MStar Semiconductor, Inc., Hsinchu Hsien (TW); MStar Semiconductor, Inc., Grand Cayman (KY); MStar Software R&D (Shenzhen) Ltd., ShenZhen (CN)

(72) Inventors: Simon George-Kelso, Cambridge (GB); Francesc Boixadera, Cambridge (GB)

(73) Assignees: MStar Semiconductor, Inc., Grand Cayman (KY); MStar Semiconductor, Inc., Hsinchu Hsien (TW); MStar Software R&D (Shenzhen) Ltd., Shenzhen (CN)

( * ) Notice: Subject to any disclaimer, the term of this patent is extended or adjusted under 35 U.S.C. 154(b) by 181 days.

(21) Appl. No.: 13/623,969

(22) Filed: Sep. 21, 2012

(65) Prior Publication Data
US 2014/0015505 A1    Jan. 16, 2014

(30) Foreign Application Priority Data
Jul. 11, 2012    (EP) ...................................... 12175846

(51) Int. Cl.
G05F 1/46 (2006.01)
H02M 3/156 (2006.01)
G05F 1/10 (2006.01)
H02M 1/00 (2007.01)

(52) U.S. Cl.
CPC ................ H02M 3/156 (2013.01); G05F 1/10 (2013.01); G05F 1/46 (2013.01); H02M 2001/0032 (2013.01); Y02B 70/16 (2013.01)

(58) Field of Classification Search
CPC ....................................................... H02M 3/156
USPC ......... 323/282, 283, 284, 285, 274, 222, 225, 323/266
See application file for complete search history.

(56) References Cited

U.S. PATENT DOCUMENTS

| | | | | |
|---|---|---|---|---|
| 7,378,889 | B2 * | 5/2008 | Wu | 327/176 |
| 2009/0302817 | A1 * | 12/2009 | Nagai | 323/282 |
| 2010/0156363 | A1 * | 6/2010 | Chiu | 323/274 |
| 2011/0187339 | A1 * | 8/2011 | Trattler et al. | 323/283 |

FOREIGN PATENT DOCUMENTS

TW    201025790 A    7/2010

OTHER PUBLICATIONS

Aivaka, "Linear or LDO Regulators & Step-Down Switching Regulators", www.Aivaka.com, Aug. 24, 2007, 2 pages.
Taiwan Office Action dated Dec. 18, 2014, 7 pages.

* cited by examiner

*Primary Examiner* — Matthew Nguyen
*Assistant Examiner* — Trinh Dang
(74) *Attorney, Agent, or Firm* — Edell, Shapiro & Finnan, LLC

(57) ABSTRACT

Techniques are provided that can extend the efficiency of a switching regulator further into the low current region by making use of the available knowledge on predictable load variations and voltage ripple tolerance across different states, providing improved efficiency and reducing total current consumption. The load current requirement in low power states is provided using switch mode rather than linear regulation, the switch mode operation being controlled by a mode dependent control circuit so as to minimize the energy cost of the switching operation in each mode and thus obtain improved efficiency from the power source.

20 Claims, 8 Drawing Sheets

VOLTAGE REGULATOR WITH FAST AND SLOW SWITCHING CONTROL

FIELD OF THE INVENTION

The present disclosure relates to the application of voltage regulator circuits and more particularly to improving the efficiency in low power modes, for products with sleep modes, thus reducing the total current consumption in battery powered devices.

BACKGROUND OF THE INVENTION

The increase in both the performance and portability of electronic devices creates challenges in that the underlying integrated circuits (ICs) require greater amounts of power to provide a greater degree of functionality and accuracy, while the physical dimensions of the devices are progressively reduced to improve portability.

Voltage regulators are a particular type of circuit that is necessary for the functionality of portable electronic devices. They are used to convert a supply voltage from one value to a different value, typically from a high voltage to a lower voltage. A voltage regulator may be used to convert an input supply voltage to an operating voltage that is applicable to, or more efficient for, a particular circuit. In some cases, voltage regulators may be used to provide current to a load at a stable voltage, despite a varying supply voltage, such as from a battery. In other cases, both of these functions may be important. For example, the battery voltage in a typical mobile phone is nominally 3.6 volts, but varies considerably as the battery discharges. Some of the integrated circuits within a mobile phone are designed to operate at voltages as low as 1.1 volts, to minimize power consumption. Voltage regulators are generally required to provide a constant output voltage regardless of whether the input voltage or the load current varies. Regulation is achieved by sensing the output voltage and adjusting the energy supplied to the output circuit in response to departures from the target voltage. In a linear regulator this adjustment takes place continuously, but in a switching regulator energy is supplied in discrete pulses which may vary in frequency and duration.

Switch mode conversion operates by transferring pulses of energy from a voltage source to storage elements such as inductors or capacitors, and redistributing that energy in such a way that the required voltage or current is delivered to the load with minimal losses. This is accomplished with control and switching circuitry that regulates the rate at which energy is transferred to the output. The duty cycle, that is, the ratio of on/off time, of the switching circuitry controls the amount of energy available at the load.

In a modern battery powered device, the output current required to supply a microprocessor IC might vary from around one ampere when the device is performing a processor-intensive task, such as processing high-quality graphics, to around 200 microamperes when the device is in a sleep mode. In sleep modes, the device's processor may be doing nothing more than waking up occasionally to perform housekeeping activities or respond to user input. Since the battery life of portable devices is critically important to customers, improving that battery life is important to device designers. The efficiency of switching regulators is generally best at moderate to high output currents (see, for example, U.S. Pat. No. 5,994,885), and falls off at lower output currents due to current in the control and switching circuitry, which at low output currents consumes a higher percentage of the total output power. To this end, the typical prior art solution adopted is to combine a switching regulator, for use when the required load current is high, with a linear regulator, for use when the load current is low (see, for example, U.S. Pat. No. 7,880,456 and U.S. Pat. No. 7,990,119).

A linear regulator includes an active pass device, such as a field-effect transistor or bipolar transistor. Effectively, the pass device is controlled, using feedback from the regulator output, to act as a variable resistance, so that the output voltage is maintained at a desired level, regardless of variation in the load current or in the input supply voltage. Those skilled in the art are aware that linear regulators become less efficient as the difference between input and output voltage increases, because of the resistive voltage drop across the pass device (see Aivaka White Paper WP1: "Linear or LDO Regulators & Step-Down Switching Regulators").

Both types of regulator require a finite time to respond to changes in the load current, and to this end one or more capacitors are connected across the regulated output to store a reservoir of charge which can supply the short term current requirements of the load. This means that the output voltage will depart from the nominal voltage when the supply current or the load current changes. Product design ensures that under normal operation the voltage ripple is sufficiently small that functionality is not degraded.

In a switching regulator one or more inductive elements may additionally be used to store energy for supply to the output. When the output current is high, the inductive elements maintain the output current in between consecutive switching pulses. If the stored energy in the inductive elements does not drop to zero between pulses this is termed "continuous mode", and typically includes the region of maximum conversion efficiency. When the switching regulator operates at low currents, the on-time or the frequency of energy pulses may be reduced to match the rate of energy supply to the output demand. If the current becomes low enough the energy in the inductive components is allowed to drop to zero between switching pulses ("discontinuous mode"). During the off period between energy pulses the output voltage is maintained by the external capacitance. The control circuit normally remains active so that it can respond to increased current demand when it occurs but constant energy losses in the control circuit mean that conversion efficiency in the discontinuous mode falls off as the output current is reduced.

The invention described herein provides techniques for products with sleep modes which, by making use of the available knowledge on predictable load variations and voltage ripple tolerance across different states, reduce the energy requirement of the control circuitry of a switching regulator. This extends the efficiency of a switching regulator further into the low current region, providing improved efficiency in lower power states when compared to a linear regulator, such that the need for a linear regulator nay be removed.

SUMMARY OF THE INVENTION

Techniques are provided herein, that allow switching efficiency gains to be achieved in low power modes, for products with sleep modes, reducing total current consumption and removing the need for a linear regulator.

Techniques are provided such that switch mode conversion can be used efficiently in both low and high power modes, by adapting the operation of the switching regulator control circuitry in response to changes in the operating mode of the product.

High power modes which may have rapidly varying current requirements use the normal high frequency control. In low current modes where current requirements are low and slowly changing, the rate at which energy pulses are required at the regulator output can be significantly reduced compared to the peak current case. In addition, the length of time that the external capacitance can maintain the output voltage between defined voltage limits is significantly extended, because the rate at which the voltage falls between consecutive energy pulses is determined by the reduced output current rather than the maximum current. It is further possible that ripple requirements in low current modes can be relaxed if sensitive analogue circuitry is not needed in such modes. The combination of these three factors greatly reduces the maximum frequency at which the control circuit is required to operate in low current modes. By disabling unused portions of the high current control circuit in low current modes, and ensuring that the low power control circuit design minimizes quiescent current between switching pulses, the current requirements of the control circuitry can be reduced in low current modes, thereby improving efficiency.

According to one aspect of the invention, the current pulses in low power modes can be supplied in response to a reduced frequency clock. This clock may be already present in the product (for example, many products use a low frequency clock signal to maintain a real time clock, and this would remain active in low power modes), or may be supplied by a dedicated low power oscillator. In either case, some form of pulse width control is also required, for example fixed width pulses from a monostable circuit or variable width pulses which terminate when the output voltage reaches a predetermined upper threshold. It is not necessary to provide a pulse on every clock edge if the output voltage is sufficiently far above a minimum threshold.

According to a further aspect of the invention, the current pulses in low power mode can be supplied on demand rather than in response to a clock oscillator. The provision of current pulses in this embodiment is determined by sensing circuitry in the switching regulator control circuit that monitors the output voltage and generates one or more current pulses whenever the output voltage falls below a predetermined threshold.

The switch over from a high to a low power mode is controlled by a control configuration select circuit which enables the control circuit for the low power mode and disables those portions of the high frequency control circuit which are not required for low power mode operation. The control configuration select circuit receives input signals defining the required mode and the product state, and these are used to configure the control circuit for high power or low power operation.

The return from a low to a high power mode is preceded by re-enabling the high power control circuit so that rapid changes in current can be accommodated, and disabling unused portions of the low power control circuit. When the re-enabling is complete the high power mode can be entered. This will normally occur in response to an input signal such as an interrupt.

When the control circuit is configured for low power operation there is an upper limit to the current that can be supplied. If the load current in a low power mode approaches or exceeds this level then the high power mode may be re-enabled. This can occur if, for example, circuit leakage current increases due to rising temperatures.

According to one aspect of the invention, switch over from low power to high power control mode, when the load current approaches the maximum available in low power mode, can be achieved by accumulating the size and number of current pulses supplied over a predetermined period. If the amplitude of the combined current pulses exceeds a predetermined threshold the high power control mode can be enabled.

According to a further aspect of the invention, one or more sensors monitoring physical variables that might influence the power consumption of the product circuitry can be used to initiate switch over to higher power modes. For example, one or more temperature sensors can be used to monitor any temperature rises causing an increase in the load current due to increased leakage current in the components.

DESCRIPTION OF EXAMPLE EMBODIMENTS

The example embodiment describes a switching regulator with control circuitry used for products that have a normal high power mode, but have sleep modes where activity is reduced to the absolute minimum. The sleep mode current is low and varies slowly, with ripple current requirements that are relaxed because no sensitive analogue circuits are active, for example, as in cellular phones. The control processor, control circuitry and main clock can be stopped, with only wakeup circuitry required to restore activity using a timed asynchronous interrupt.

Figure 1:
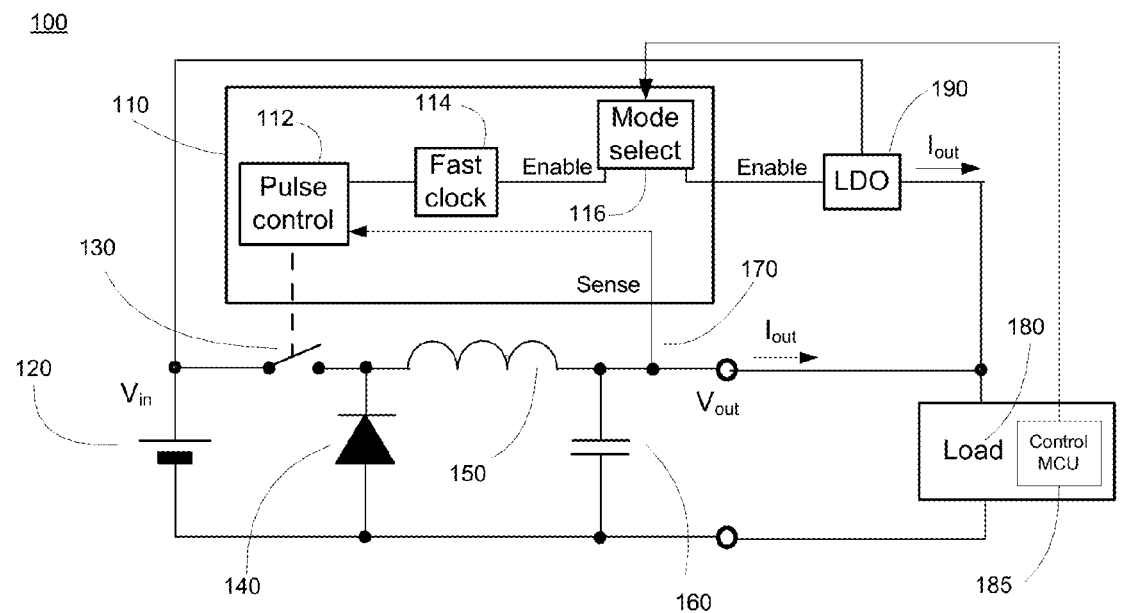
FIG. 1 is an example block diagram of a prior-art solution showing a switching regulator and linear regulator combination.

Referring first to FIG. 1, a typical prior-art switching regulator and linear regulator combination is shown in simplified form at reference numeral 100, and comprises control circuitry 110, a power source ($V_{in}$) 120, switching and storage elements 130-160, output voltage ($V_{out}$) sensing 170, and a linear regulator 190, in this embodiment it is a low-dropout regulator (LDO). The output of the regulator 190 is applied to the load 180 which draws a load current ($I_{out}$) that varies according to the device mode and activity. Some of the load current powers a microcontroller unit (MCU) 185 which is responsible for switching between high and low power modes. The MCU may be, for example, a microcontroller, a state machine or a combination of the two. If a microcontroller cannot run software in sleep mode, a hardware state machine may be needed to return to active mode.

In high power mode, the load requirements can change rapidly, so a fast clock 114, typically 1-2 MHz, is used by the pulse control circuit 112 to control the switching element 130. The use of a high frequency clock minimises the size and cost of the energy storage components, inductor 150 and capacitor 160, while providing a fast response to load variations, and minimizing supply voltage ripple. At each clock cycle the sense input 170 is used by pulse control 112 to determine whether to output a switching pulse or not, and what the duration of the switching pulse should be.

Modern battery powered products are designed to spend the majority of time in low power modes, or sleep modes, to maximize battery life, switching to high power modes to respond to external input or, periodically, to perform necessary internal system tasks. Mode select 116 switches between the low power and high power modes, initiated by control signals from the product. In high power modes the LDO 190 is disabled and the fast clock 114 and pulse control 112 are enabled. In low power mode the LDO 190 is enabled and the fast clock 114 and pulse control 112 are disabled. The efficiency of the regulator in low power mode is reduced to below 50% by the power drop across the pass device in the LDO and the power consumed by the control and switching circuitry even when disabled.

Figure 2:
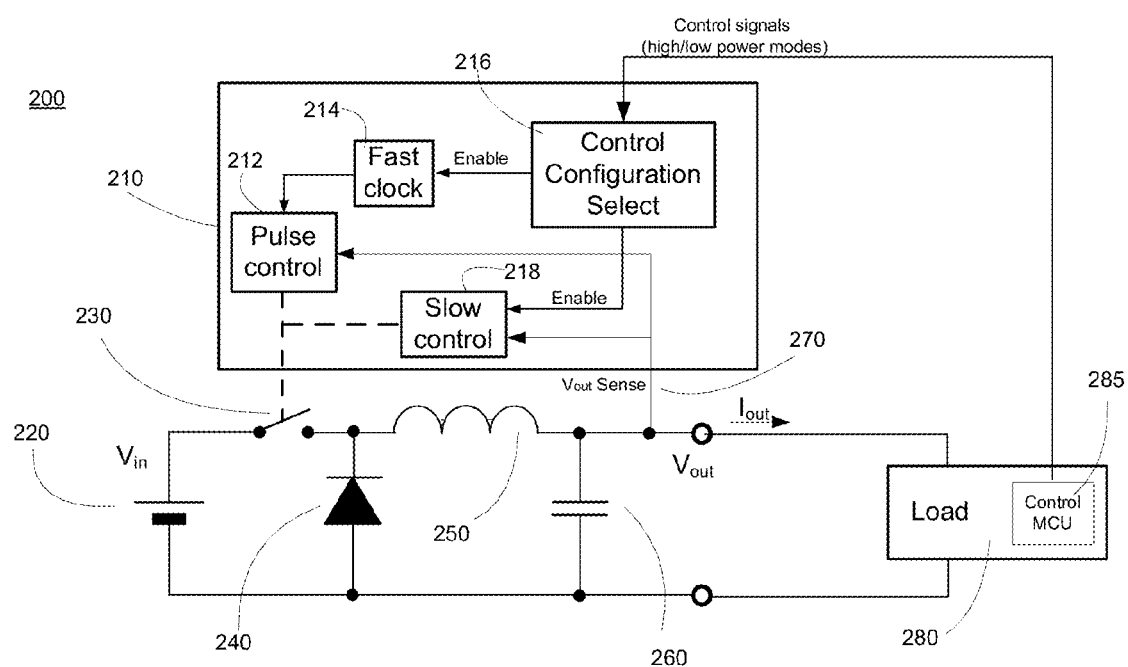
FIG. 2 is an example block diagram of the embodiment of a switching regulator used in both high power and low power switching modes.

FIG. 2 shows an example embodiment of the switching regulator 210 used in a device 200. The switching regulator 210 is configured to control the supply of power from a power source 220 to an example power load 280 and includes storage elements 230-260 and an output voltage sensor 270. Techniques used in the switching regulator control circuitry 210 replace the LDO 190 in the low power modes of the regulator shown in FIG. 1. The switching regulator 210 includes a control configuration select unit 216, a slow control unit 218, also a pulse control unit 212 and a fast clock 214. Control configuration select unit 216 is used to switch between low power and high power modes. For low power mode, slow control unit 218 is enabled and controls the switching circuitry 230 while the fast clock 214 and pulse control unit 212 are disabled. High power mode is achieved by enabling the fast clock 214 and pulse control unit 212 with the slow control unit 218 disabled. In another embodiment elements of the low power circuit can be shared with the high power circuit where appropriate.

The MCU 285 controls the switching between high and low power modes. Control signals from the MCU 285 are received by the control configuration select unit 216 to either switch the regulator 210 to a low power mode after the product has entered a sleep mode, or switch the regulator 210 back to a high power mode. Switching back to high power is performed prior to the device waking up, to enable the clock 214 to settle and normal system power to be restored.

Low power operation is achieved by performing discontinuous switch mode conversion at a much lower frequency using the slow control circuit 218. The pulses necessary to control the switching element 230 may be derived from a pre-existing low frequency oscillator, such as the 32 kHz clock used by many systems for timekeeping tasks, or from a dedicated circuit, such as a low power relaxation oscillator.

The reduction in the switching rate can result in a large ripple which may not be acceptable in the high power mode. However, such a large ripple will typically be tolerable in low power mode since in this period of time system on chip (SoC) and dynamic random access memory (DRAM) are not being clocked and only need to retain their state. Hence, despite the presence of ripples, as long as the average output voltage $V_{out}$ is stable and as the output voltage $V_{out}$ always exceeds a retention voltage threshold, the regulator 200 can operate with low leakage current in low power mode.

The output voltage sensor 270 is used by the slow control unit 218 to detect if the output voltage $V_{out}$ drops too close to a predetermined threshold, set above the retention threshold, at which point the slow control 218 activates the switching element 230 to provide current transfer from the voltage source (such as a battery) 220 to the storage elements 250, 260, raising the output voltage above the threshold. The size of the current pulse is determined solely by the pulse duration.

The maximum pulse duration is limited by the level of ripple that can be tolerated by the load 280. In order to comply with the ripple requirements in low current modes, the slow control circuit 218 must supply pulses of less than or equal to the maximum pulse duration at an average rate to match the load current requirements.

In one embodiment of the invention, this can be achieved by providing pulses at a defined low frequency, adjusting the average rate as necessary by skipping pulses. In another embodiment of the invention, the average rate can be achieved by providing pulses on demand, as determined by the sensing input 270.

In a further embodiment of the invention, the ripple can be reduced for loads that have tight ripple requirements in low current modes by using narrow current pulses at a higher frequency.

Figure 3:
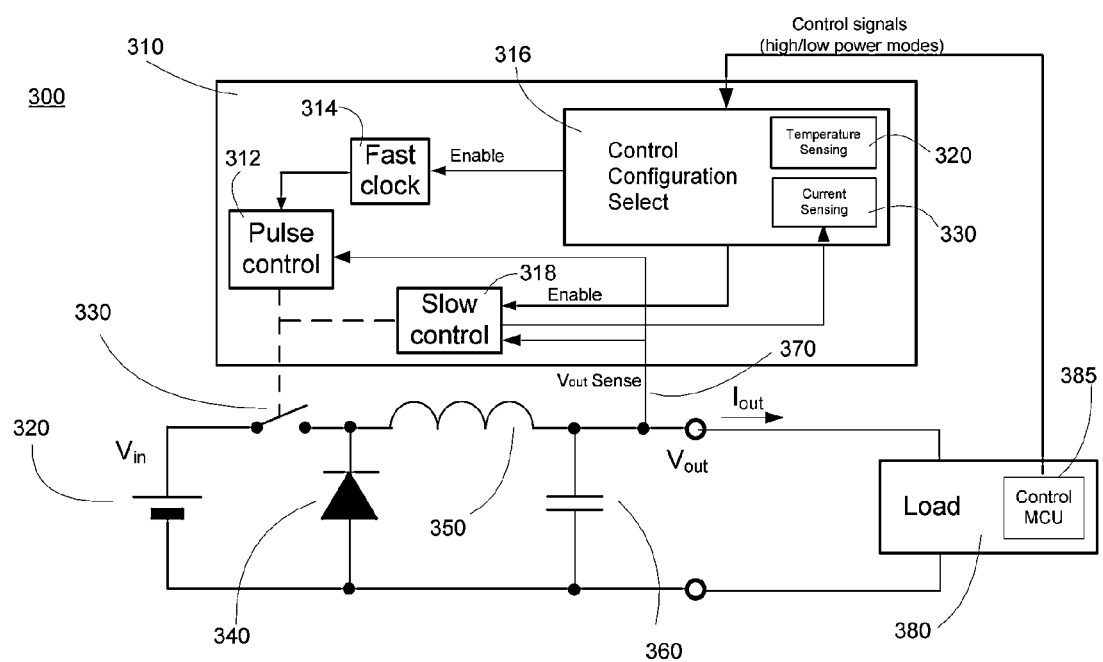
FIG. 3 is an example block diagram of the embodiment of a switching regulator, used in both high power and low power switching modes, with temperature and current sensing circuits.

FIG. 3 shows a block diagram of a further embodiment of a switching regulator 310 used in both high power and low power switching modes, with temperature and current sensing override controls. Control configuration select unit 316 is used to switch between low power and high power modes. For low power mode, slow control 318, is enabled and controls the switching circuitry 330 while the fast clock 314 and pulse control 312 are disabled. High power mode is achieved by enabling the fast clock 314 and pulse control 312 with the slow control 318 disabled.

Control configuration select unit 316 has temperature and current sensing circuits that enable the mode selections coming from the MCU 385 to be overridden. The load current in low power modes may increase if the temperature rises, due to increased leakage current in the electronic components or to external temperature variations. In this case the current sensor 330 or temperature sensors 320 cause the control configuration select unit 316 to select a higher power mode to supply the increase in current requirement. The control configuration select unit 316 returns the switching regulator 310 to a low power mode once the current sensor 330 and temperature sensors 320 return below their switching thresholds. In a further embodiment the temperature and current sensing can be external to the switching regulator control circuitry and interface directly with the MCU.

Switchover to high power mode needs to be achieved in the case where a change of state to the high power state is imminent. The control configuration select unit 316 receives control signals from the MCU 385 to initiate re-enabling of high power mode prior to the required state change.

In a further embodiment the control signals for mode changes can be applied to the control configuration select unit 316 directly, for example, in the case of user input. The control configuration select unit 316 then informs the MCU 385 of the mode change request so that the device can be put into the correct power state.

Figure 4:
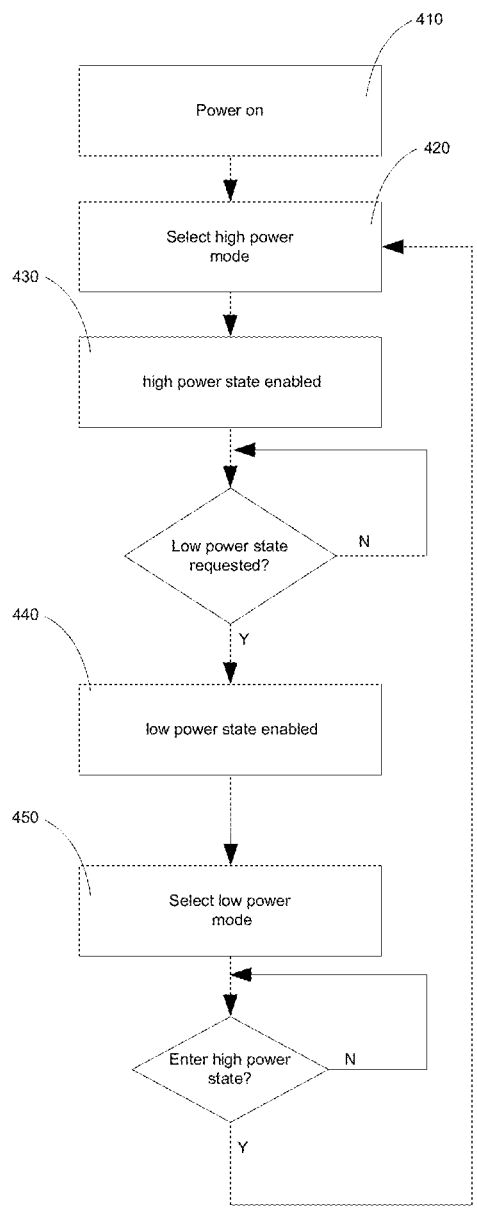
FIG. 4 is an example flow chart of the control sequence for a product with a single high power and a single low power state.

FIG. 4 shows a flow chart of the control sequence for a device with a single high power and a single low power state is shown. It will be obvious that at the step of initial power on 410, power on reset selects a high power state for the initial boot up sequence of the device. At step 420, high power control mode is selected and once the regulator has settled and can provide the required output power, the high power state is enabled at step 430. The MCU remains in the high power state until a change in the output power level is requested.

When the MCU detects that the low power state has been requested at step 440, for example when sleep mode is initiated, then the low power state is enabled and then at step 450 the control configuration select unit in the control circuitry selects the regulator low power mode. The regulator remains in the low power mode until a further state change is detected by the MCU.

Figure 5:
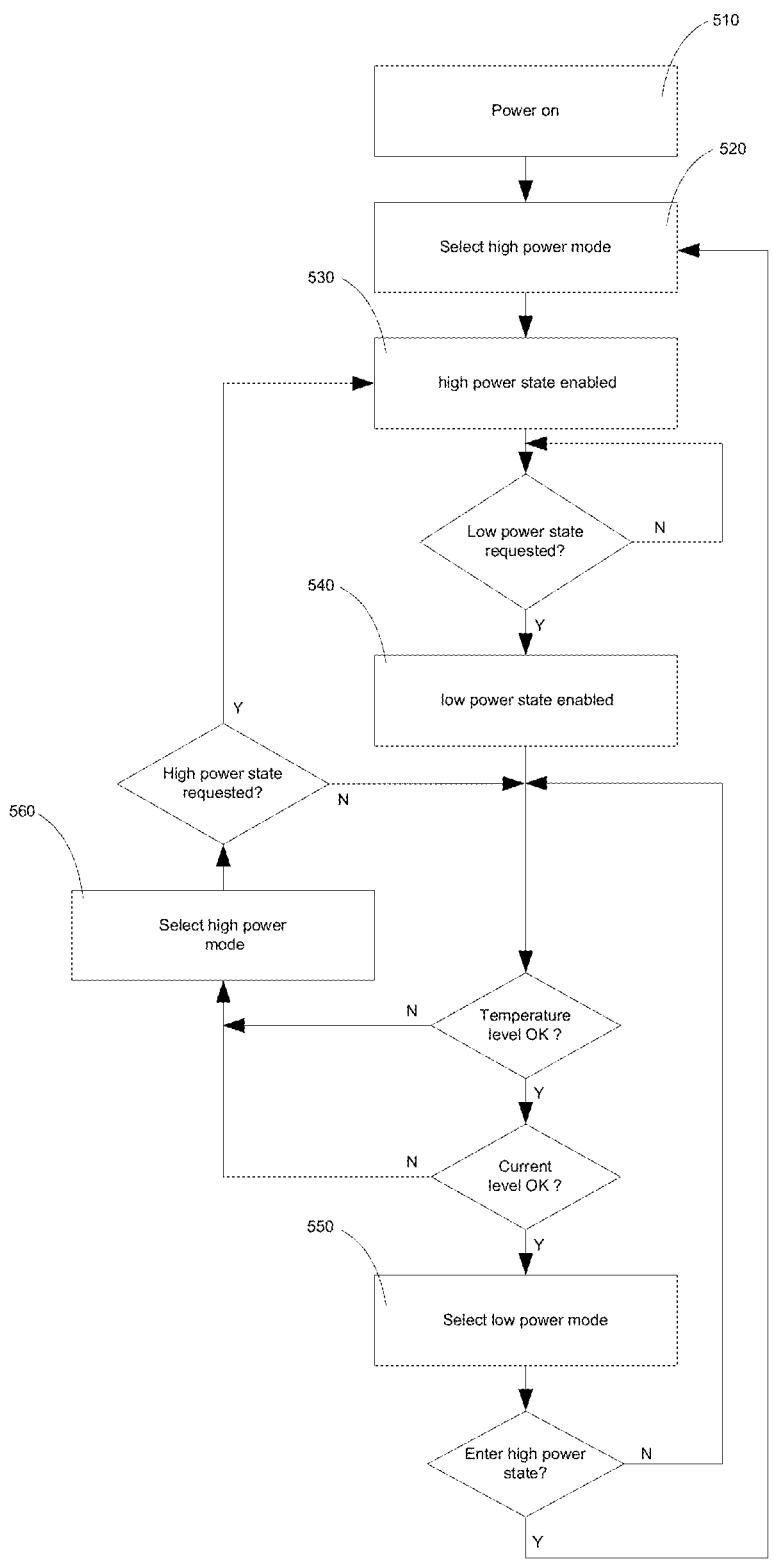
FIG. 5 is an example flow chart of the control sequence for a product with a single high power and a single low power state with temperature and current sensing controls.

FIG. 5 shows a flow diagram of the control sequence for a device with a single high power and a single low power state, with current and temperature sensors. It will be obvious that at step 510, initial power on, power on reset selects a high power state for the initial boot up sequence of the device. At step 520, high power mode is selected and once the regulator has settled and can provide the required output power, the high power state is enabled at step 530. The MCU remains in the high power state until a change in the output power state is requested.

When the low power state is requested the MCU enables the low power state at step 540. Referring back to FIG. 3, assuming levels of the temperature sensor 320 and current sensor 330 are acceptable then the control configuration select unit 316 switches the switching regulator into the low power mode at step 550. Temperature and current levels are monitored continuously at the control configuration select unit 316 while the MCU remains in the low power state, and if either exceeds a predefined threshold the control configuration select unit 316 switches the regulator to the high power mode at step 560 to provide additional current. The MCU can then decide to remain in the low power state or to request the high power state at step 530 should the device need to be awakened. If the MCU remains in the low power state at 540, when the temperature or current subsequently fall below their predefined thresholds the control configuration select 316 reselects the low power mode at 550.

When a request for the high power state is received by the MCU 185, the control configuration select unit 316 switches the regulator to the high power mode at 520, before the MCU is allowed to switch to the high power state at 530.

Figure 6:
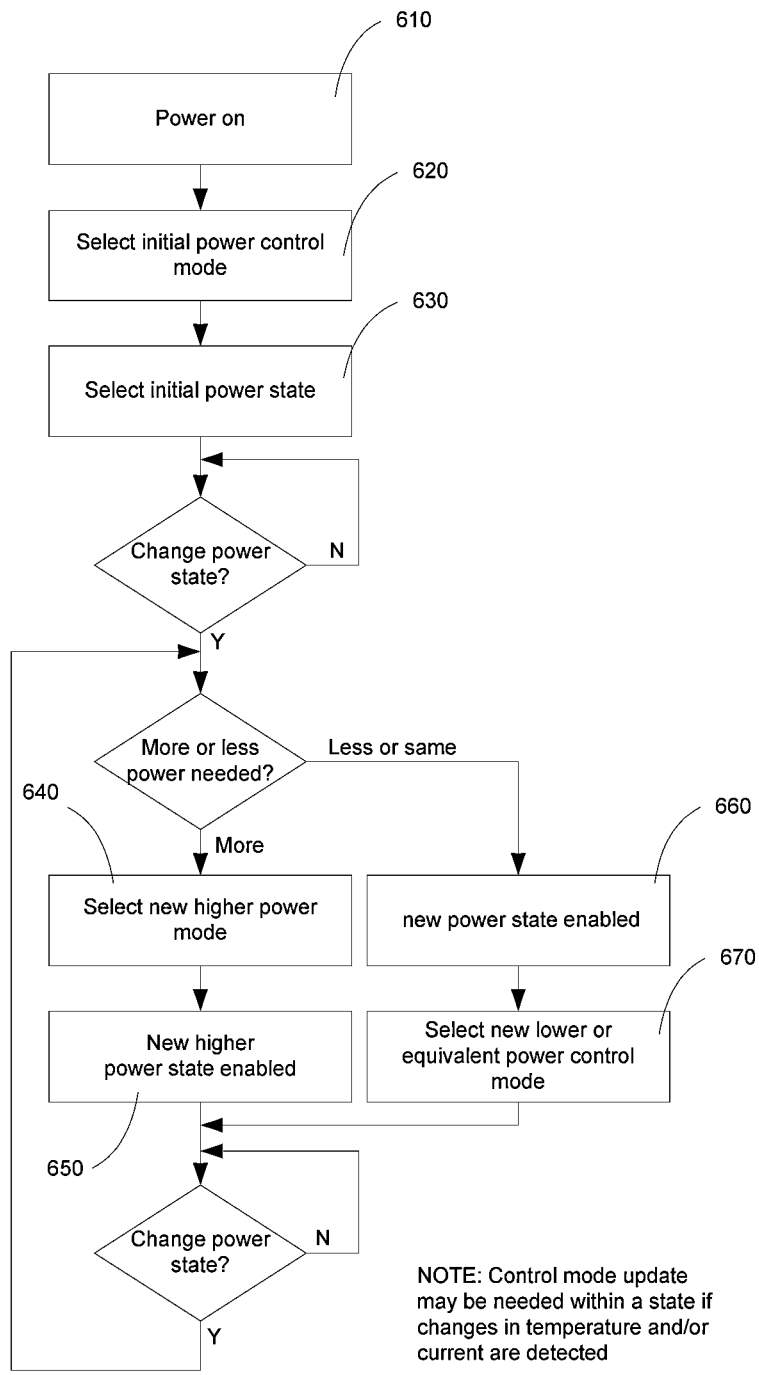
FIG. 6 is an example simplified flow chart of the control sequence for a product with multiple high power and low power states.

Referring to FIG. 6 a simplified flow diagram of the control sequence for a product with multiple high power and low power states is shown. Each of the multiple power states has its own optimized mode within the regulator. It will be obvious that at initial power on, at step 610, power on reset selects an initial power mode at 620 of the regulator, and once the regulator has settled and can provide the required output power, the MCU enables the appropriate power state at 630. The MCU remains in the selected power state until a change is requested.

When the MCU detects a power state change request, a decision is made as to whether more or less power is required. Assuming more power is required the regulator is switched to a higher power mode at step 640 before the MCU enables a new higher power state at step 650. If equivalent or less power is required then the MCU enters the new lower power state at 660 before the control configuration select unit 316 switches the regulator to the new power mode at 670. The MCU remains in the new power state until a further change is requested. As in the embodiment in FIG. 5, changes to the power mode may be required if changes to the temperature or current levels are detected.

Figure 7:
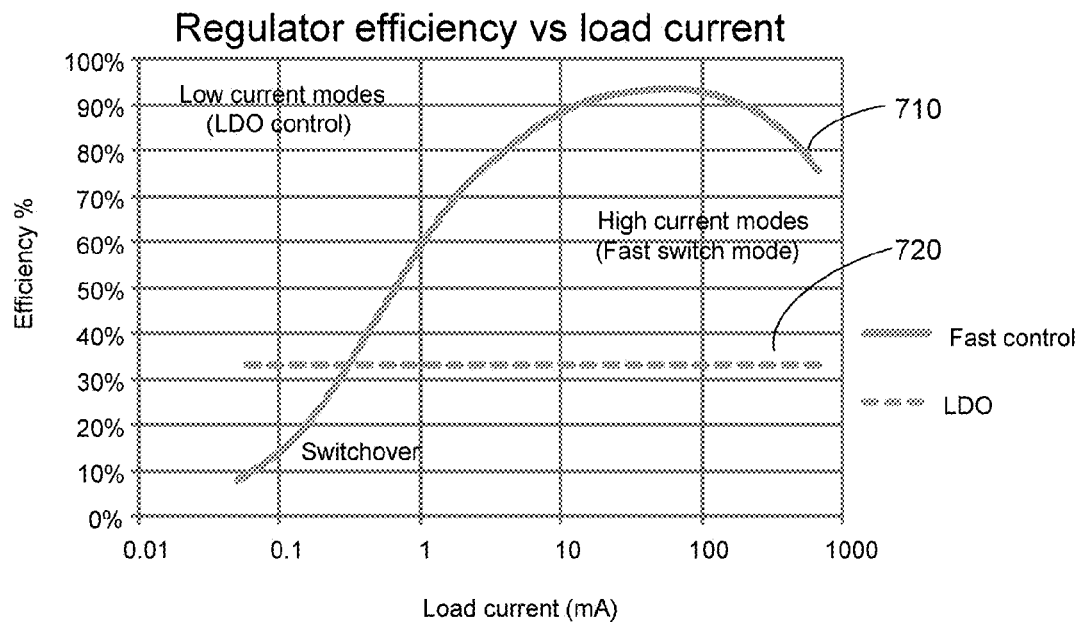
FIG. 7 is an example graph of regulator efficiency versus load current for a prior-art solution using a switching regulator and linear regulator.

Referring to FIG. 7, typical efficiency versus load current graphs for a prior-art solution are shown. The high power mode 710 graph shows the typical percentage efficiency against load current for a switching regulator. The low power mode 720 graph shows the typical percentage efficiency against load current for a typical LDO. The efficiency of the LDO can never exceed the ratio of $V_{out}V_{in}$. The switchover from switching regulator to LDO typically takes place at a load current of less than 1 mA where the efficiency of the switching regulator is less than 50%.

Figure 8:
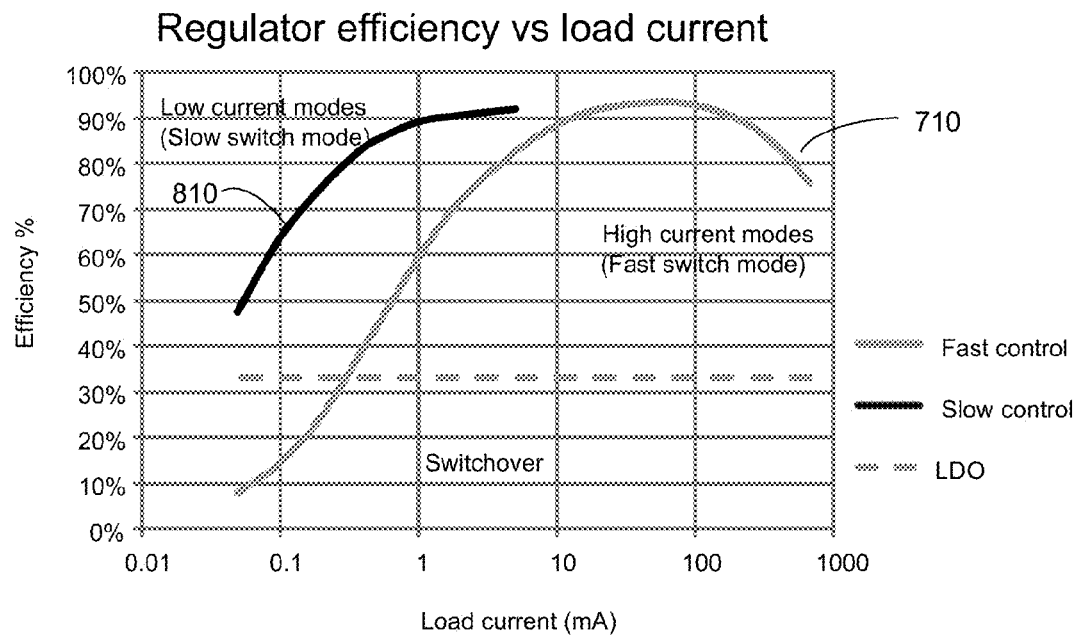
FIG. 8 is an example graph of regulator efficiency versus load current for a switching regulator using fast and slow control as described herein.

Referring to FIG. 8, typical efficiency versus load current graphs for the embodiments described herein are shown. The high power mode graph 710 is identical to that of FIG. 7 as there is no change to the high power mode control. The low power mode 810 graph shows the typical percentage efficiency against load current when low frequency switch mode conversion is employed in the switching regulator. The switchover from fast clock 314 to slow control unit 318 can now be performed to maintain the efficiency of the regulator at over 75%.

Assuming a load current $I_{out}$ of 200 µA with a $V_{out}$ of 1.2 V supplied from a 3.6 V battery, the conversion efficiency of the low power mode control is 75%, with a battery current of 88.9 µA. In FIG. 8 it is seen that a conventional linear regulator, or low-dropout regulator (LDO), in low power mode would draw 200 µA from the battery, with an efficiency of 33%. Therefore the reduction in battery current achieved by using the low frequency switch mode conversion is 55%.

Figure 9:
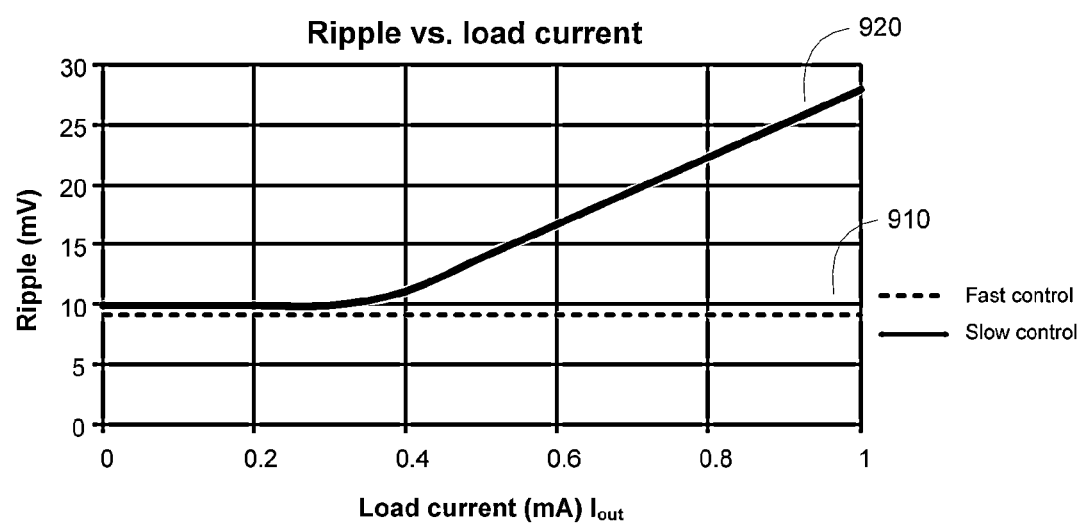
FIG. 9 is an example graph of ripple versus load current for both fast and slow control modes of the regulator.

Turning to FIG. 9, typical ripple voltage versus load current graphs for both high power mode control 910 and low power mode control 920 are shown. At low load currents the amount of ripple for both high power and low power modes are similar. At a load current $I_{out}$ of 1 mA the ripple when using low frequency switch mode conversion in low power mode becomes unacceptable. In this case, the ripple can be reduced by supplying smaller current transfer pulses at a higher frequency. This increases the losses in the control circuitry 310 slightly, but higher output power means that the overall efficiency increases to approximately 85%, with a battery current of 400 µA. An LDO in the prior usage in low power mode would typically draw 1 mA from the battery, with an efficiency of 33%. Therefore the reduction in battery current achieved by using the low frequency switch mode conversion is 60%.

At load currents greater than 1 mA, reverting to high power mode control, employing high frequency switch mode conversion, maintains the efficiency at greater than 75%.

By switching off unnecessary circuits, such as the high frequency oscillator, and employing low frequency switch mode conversion, the losses in the conversion control circuitry are reduced. This means that voltage conversion efficiency in low power mode can be similar to that in high power mode over a wider range of current, at the expense of larger voltage ripple that can be tolerated by circuitry in an idle state.

Although the apparatus, system, and method are illustrated and described herein as embodied in one or more specific examples, it is nevertheless not intended to be limited to the details shown, since various modifications and structural changes may be made therein without departing from the scope of the apparatus, system, and method, and within the scope and range of equivalents of the claims. Accordingly, it is appropriate that the appended claims be construed broadly and in a manner consistent with the scope of the apparatus, system, and method, as set forth in the following claims.

What is claimed is:

1. A switching regulator, configured to control a supply of power from a power source to a power load, comprising:
    a control configuration select unit, for selecting between a high power mode and a low power mode in response to a control signal which depends on a state of the power load, the control signal being received from a controller associated with the power load;

a first control unit, enabled by the control configuration select unit when selecting the high power mode, the first control unit comprising a fast clock that is configured to drive a pulse control unit to deliver pulses to switching circuitry; and a second control unit, enabled by the control configuration select unit when selecting the low power mode, the second control unit comprising a slow clock, wherein a frequency of the slow clock is lower than a frequency of the fast clock, the slow clock configured to cause the switching circuitry to switch at a lower rate than the fast clock, wherein when the first control unit is enabled the second control unit is disabled, and when the second control unit is enabled the first control unit is disabled.

2. The switching regulator according to claim 1, wherein a target output voltage in the low power mode is set to a level which is related to a retention voltage of a device.

3. The switching regulator according to claim 1, wherein when the first control unit is enabled, the first control unit outputs switching pulses at a first clock rate, and when the second control unit is enabled, the second control unit outputs the switching pulses at a second clock rate that is lower than the first clock rate.

4. The switching regulator according to claim 1, wherein the second control unit is configured to achieve lower power consumption than the first control unit.

5. The switching regulator according to claim 1, wherein characteristics of a plurality of switching pulses provided by the second control unit are configured dependent on a maximum voltage ripple that can be tolerated by the power load.

6. The switching regulator according to claim 1, further comprising one or more sensors for measuring physical properties of the power load for determining whether the control configuration select unit enables the first control unit or the second control unit.

7. The switching regulator according to claim 1, wherein while the second control unit is enabled, the control configuration select unit monitors one or more input signals to detect an imminent change of the state of the power load that is able to trigger a re-enabling of the first control unit before the power load returns to a high power state.

8. The switching regulator according to claim 2, wherein when an output voltage of the switching regulator is below the target output voltage, the second control unit is configured to increase an energy supply so as to maintain the output voltage of the switching regulator above the retention voltage.

9. The switching regulator according to claim 3, the second control unit is configured to output the switching pulses at a third clock rate which is higher than the second clock rate, the pulses at the third clock rate being able to maintain the output voltage to the power load above the retention voltage.

10. The switching regulator according to claim 6, wherein the one or more sensors is a voltage sensor.

11. The switching regulator according to claim 6, wherein the one or more sensors is a temperature sensor.

12. The switching regulator according to claim 6, wherein the one or more sensors adapts different sensing thresholds respectively corresponding to the high power mode and the low power mode so as to reduce a transition rate between the high power mode and the low power mode.

13. The switching regulator according to claim 6, wherein the one or more sensors is a current sensor.

14. The switching regulator according to claim 13, wherein the current sensor is used to sense accumulated current as a result of switching pulses delivered in a given period of time to determine whether the control configuration select unit selects a different power mode.

15. The switching regulator according to claim 14, wherein the switching pulses are accumulated in number or in size to perform a measurement of output current.

16. A method for controlling a switching regulator to control a supply of power from a power source to a power load, comprising:

selecting, using a control configuration select unit, between a high power mode and a low power mode in response to a control signal which depends on a state of the power load, the control signal being received from a controller associated with the power load;

enabling a first control unit by the control configuration select unit when the high power mode is selected, the first control unit comprising a fast clock that is configured to drive a pulse control unit to deliver pulses to switching circuitry; and enabling a second control unit by the control configuration select unit when the low power mode is selected, the second control unit comprising a slow clock, wherein a frequency of the slow clock is lower than a frequency of the fast clock, the slow clock configured to cause the switching circuitry to switch at a lower rate than the fast clock, wherein when the first control unit is enabled the second control unit is disabled, and when the second control unit is enabled the first control unit is disabled.

17. The method of claim 16, further comprising setting a target output voltage in the low power mode to a level which is related to a retention voltage of a device.

18. The method of claim 16, further comprising, when the first control unit is enabled, outputting, from the first control unit, switching pulses at a first cock rate, and when the second control unit is enabled, outputting, from the second control unit, switching pulses at a second clock rate that is lower than the first clock rate.

19. The method of claim 16, further comprising configuring characteristics of a plurality of switching pulses provided by the second control unit dependent on a maximum voltage ripple that can be tolerated by the power load.

20. The method of claim 17, further comprising, when an output voltage of the switching regulator is below the target output voltage, increasing, using the second control unit, an energy supply so as to maintain the output voltage of the switching regulator above the retention voltage.

\* \* \* \* \*